United States Patent
Fujita et al.

(10) Patent No.: US 6,934,478 B2
(45) Date of Patent: Aug. 23, 2005

(54) BIDIRECTIONAL OPTICAL COMMUNICATION DEVICE AND BIDIRECTIONAL OPTICAL COMMUNICATION APPARATUS

(75) Inventors: Hideaki Fujita, Shiki-gun (JP); Yorishige Ishii, Yamatotakada (JP); Toshihiro Tamura, Shiki-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 650 days.

(21) Appl. No.: 10/128,776

(22) Filed: Apr. 24, 2002

(65) Prior Publication Data

US 2002/0154369 A1 Oct. 24, 2002

(30) Foreign Application Priority Data

Apr. 24, 2001 (JP) ........................................ 2001-125772

(51) Int. Cl.[7] ............................ H04B 10/12; H04B 10/06
(52) U.S. Cl. ........................ 398/141; 398/207; 398/214
(58) Field of Search ................................. 398/141, 200, 398/201, 214; 385/39, 49, 51, 52

(56) References Cited

U.S. PATENT DOCUMENTS

| | | | | |
|---|---|---|---|---|
| 4,381,882 A | * | 5/1983 | Sabine | ........................ 385/77 |
| 5,528,407 A | * | 6/1996 | Nakata et al. | ............... 398/136 |
| 5,661,581 A | * | 8/1997 | Mushiage et al. | .......... 398/136 |

FOREIGN PATENT DOCUMENTS

| | | | | |
|---|---|---|---|---|
| JP | A-11-027217 | 1/1999 | .......... H04B/10/28 |
| JP | A-11-072622 | 3/1999 | ............ G02B/6/00 |
| JP | A-11-237535 | 8/1999 | ............ G02B/6/42 |
| JP | A-11-352364 | 12/1999 | ............ G02B/6/42 |
| JP | 2000-284153 | 10/2000 | |

OTHER PUBLICATIONS

Copy of Japanese Office Action issued on Dec. 14, 2004.

* cited by examiner

*Primary Examiner*—M. R. Sedighian
*Assistant Examiner*—Dzung Tran
(74) *Attorney, Agent, or Firm*—David G. Conlin; John J. Penny, Jr.; Edwards & Angell, LLP

(57) ABSTRACT

A bidirectional optical communication device satisfies a condition of $\theta_{fb} \leq 0 \leq \theta_{fa}$ or $\theta_{fa} \leq 0 \leq \theta_{fb}$, when $\theta_{fa}$ and $\theta_{fb}$ are angles of inclination between an optical axis of an optical fiber and transmission light after incidence with a numerical aperture NA at an outermost periphery, and $\theta_{fa}$ and $\theta_{fb}$ are expressed as the follows:

$\theta_{fa} = \mathrm{Sin}^{-1}[\{n_o \mathrm{Sin}(\theta_L + \mathrm{Sin}^{-1}(NA)/n_0 + \theta_T)\}/n_f] - \theta_T$ $\theta_{fb} = \mathrm{Sin}^{-1}[\{n_o \mathrm{Sin}(\theta_L - \mathrm{Sin}^{-1}(NA)/n_0 + \theta_T)\}/n_f] - \theta_T$ where $n_f$ and $n_o$ denote refractive indexes of a core of the optical fiber and air, respectively. The bidirectional optical communication device is capable of decreasing restraint of a transmission distance by reducing fluctuation of reception efficiency by the transmission distance and reducing interference between transmission light and reception light.

7 Claims, 11 Drawing Sheets

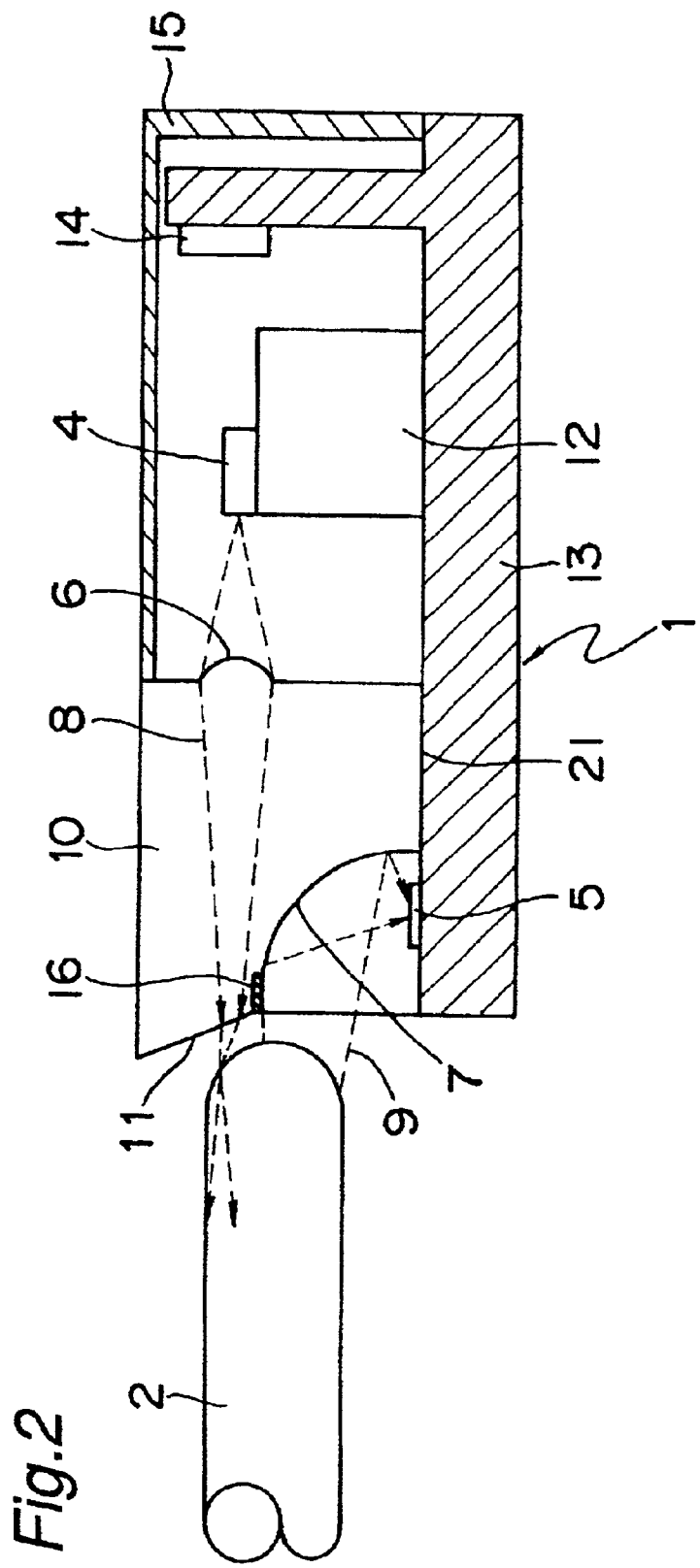

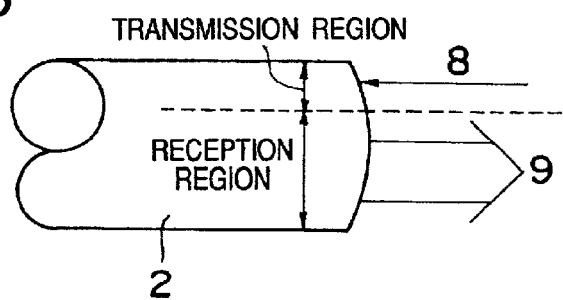
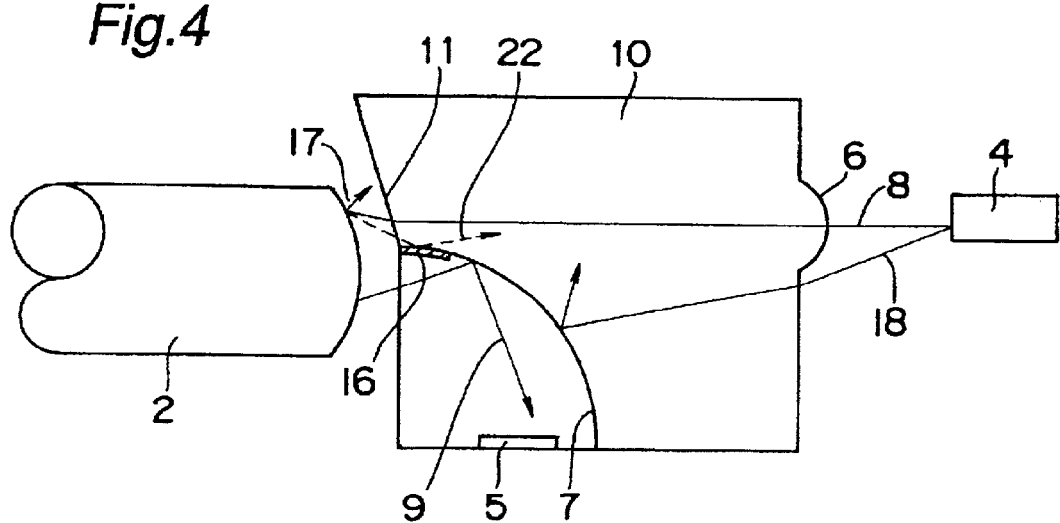

Fig.5
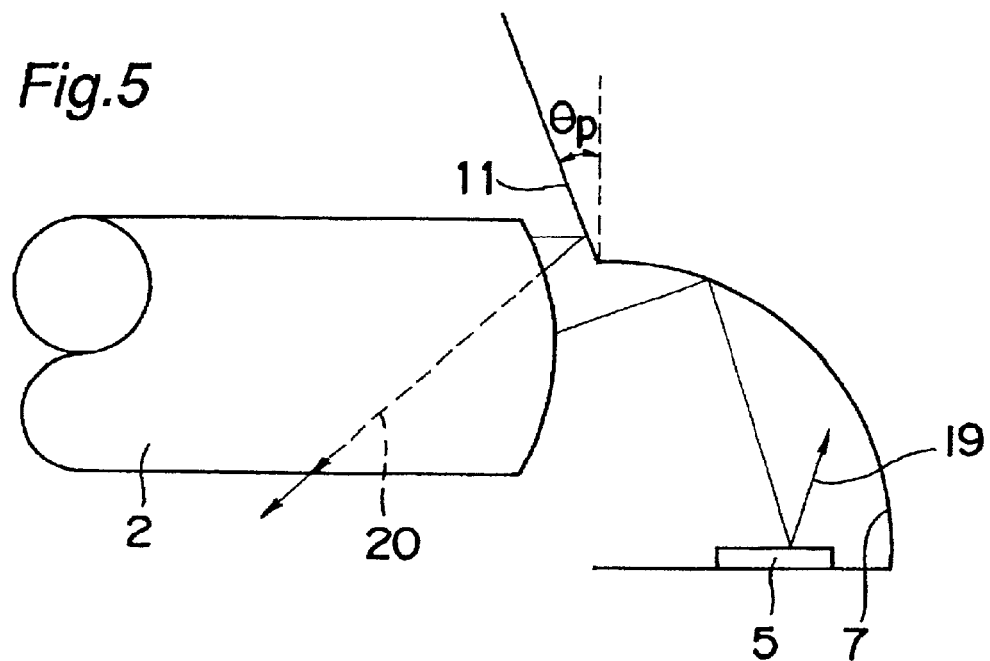
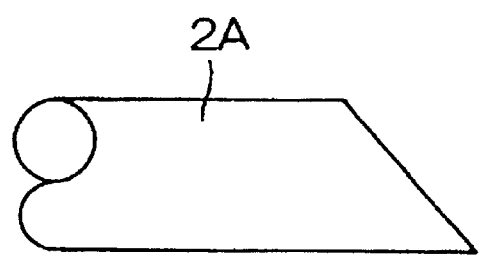
Fig.6A
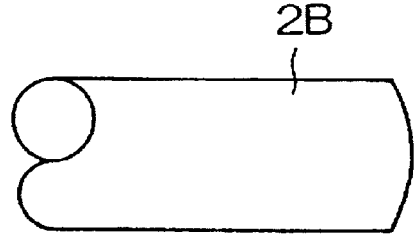
Fig.6B

BIDIRECTIONAL OPTICAL COMMUNICATION DEVICE AND BIDIRECTIONAL OPTICAL COMMUNICATION APPARATUS

BACKGROUND OF THE INVENTION

The present invention relates to a bidirectional optical communication device and a bidirectional optical communication apparatus for carrying out bidirectional transmission and reception of an optical signal, and more particularly relates to a bidirectional optical communication device and a bidirectional optical communication apparatus for use in domestic communication, communication among electronic equipment, and in LAN (Local Area Network) with a multimode optical fiber such as a plastic optical fiber as a transmission medium.

Accompanied by progress of information oriented society, network technology with use of optical fibers is attracting attention. Particularly with recent progress of low-loss broadband POF (Plastic Optical Fiber), application of optical fibers to domestic communication and LAN is proceeding. In optical communication apparatuses for transmitting and receiving signal light having an identical wavelength with use of an optical fiber as a transmission medium, the leading system has been a full duplex system with use of two optical fibers. However, use of two optical fibers brings about such problems as difficulty in downsizing of optical devices and increase in cost of optical fibers with increased transmission distance. Accordingly, there has been proposed a bidirectional optical communication device for carrying out a full duplex optical communication.

In such bidirectional optical communication device with use of one optical fiber, transmission and reception are carried out in the same optical fiber, which makes it important to prevent interference of transmission light and reception light. Main causes of the transmission light interfering the reception light include:

(1) transmission light reflecting on the end face of an optical fiber when going into the optical fiber (hereinafter referred to as "near-end reflection"), (2) transmission light traveled through an optical fiber reflecting on the end face of an optical fiber when going out of the optical fiber (hereinafter referred to as "far-end reflection"), (3) reflection from a remote bidirectional optical communication device (hereinafter referred to as "remote module reflection"), and (4) internal scattered light inside a bidirectional optical communication device (hereinafter referred to as "stray light").

Among the causes (1) to (4), the far-end reflection of (2) is determined by the shape of the end face of an optical fiber, and therefore it is difficult to control the far-end reflection by the structure of a bidirectional optical communication device. For example, in a plastic optical fiber, if having a flat end face perpendicular to an optical axis, outgoing light from the optical fiber gains far-end reflection of about 4% due to difference in refractive index between a core and air. Accordingly, there is known a method for reducing the far-end reflection by processing the end face of the optical fiber. As the shape of the end face of the optical fiber for reducing the far-end reflection, a curved surface such as a sphere and an ellipsoid is known effective as disclosed in Japanese Patent Laid-Open Publication HEI No. 11-72622.

Conventionally proposed bidirectional optical communication devices enabling full duplex communication with one optical fiber involve a method for displacing an incidence position of transmission light from the center of an optical fiber end face in radial direction and disposing a light receiving element in a position free from incidence of light reflected from the optical fiber (near-end reflection) as disclosed in Japanese Patent Laid-Open Publication HEI No. 11-27217, Japanese Patent Laid-Open Publication HEI No. 11-237535, and Japanese Patent Laid-Open Publication HEI No. 11-352364. This method will be described with reference to a bidirectional optical communication device shown in FIG. 14.

In FIG. 14, transmission light 313 emitted from a light emitting element 304 is collected by a lens 306 while an optical path thereof is changed by a riser mirror 308 so as to enable incidence in a position displaced from the center of the end face of an optical fiber 302. Reception light 309 emitted from the optical fiber 302 is coupled to a light receiving element 305 disposed opposed to the optical fiber 302. The transmission light 313 whose optical path is changed by the riser mirror 308 goes into the optical fiber 302 with an incline from periphery to the center of the optical fiber 302. Consequently, reflected light 317 reflected by the optical fiber 302 is directed to periphery of the optical fiber 302, and an area other than the light receiving element 305 is radiated therewith, which enables prevention of interference due to near-end reflection. Further, decreasing an numerical aperture (NA) of the transmission light 313 makes it possible to decrease spread of the reflected light 317, thereby ensuring prevention of near-end reflection.

However, applying the bidirectional optical communication device shown in FIG. 14 to the case of using an optical fiber whose end face is in the shape of a curved surface such as a sphere cause a following problem.

The incident transmission light to the optical fiber is refracted by difference in refractive index between the core of the optical fiber and outside (air). For example, in an optical fiber having a sphere end face, transmission light whose incidence position is displaced from the center of the optical fiber end face in radial direction is refracted toward the central direction of the optical fiber, and a refractive angle thereof becomes larger as incidence position of the transmission light to the optical fiber goes nearer to the periphery of the optical fiber. In this case, as shown in FIG. 15, transmission light 8 inside an optical fiber 2 is composed of a dominant component having a large angle against an optical axis of the optical fiber 2 (higher mode) and a fractional component having a small angle against an optical axis of the optical fiber 2 (lower mode). Normally, the mode of the transmission light 8 is converted during traveling through the optical fiber 2, so that distribution of outgoing light from the optical fiber 2 is determined only by characteristics of the optical fiber 2 without being influenced by the state of incident light. Consequently, the transmission light 8 can go into the optical fiber 2 only with consideration to the condition of coupling the transmission light 8 to the optical fiber 2 (decreasing the numerical aperture (NA) of the transmission light 8 based on the numerical aperture NA of the optical fiber 2). However, in the recent years, necessary transmission capacity has been enlarged in inter-equipment transmission, and communication with use of an optical fiber has started to be applied to the case where a transmission distance is as short as about 1 m, causing a new problem. The problem is that a short transmission distance prevents sufficient mode conversion, and outgoing light thereof is largely influenced by the state of incident light. For example, as shown in FIG. 15, when an incidence position of the transmission light 8 is displaced from the center of the sphere end face of an optical fiber 2 in radial direction, radiant intensity of the outgoing light shows, as shown with a solid line in FIG. 16, a ring-shaped distribution small in quantity of light radiated from the central part of the optical fiber and large in quantity of light in the peripheral part thereof. The influence is particularly large in the case of a large-diameter optical fiber with a number of modes such as POF.

In the case where a transmission distance is long or in the chase where transmission light goes into the middle of the optical fiber, as shown with a broken line in FIG. 16, there is obtained a distribution large in radiant intensity from the center of the optical fiber. Thus, remarkable change in the distribution of radiant intensity of outgoing light from the optical fiber due to the transmission distance or incidence condition of the transmission light causes considerable deterioration of reception efficiency in the either case depending on disposal of reception light, resulting in exceeding of a dynamic range. Particularly in the bidirectional optical communication device carrying out full duplex communication with one optical fiber, the incidence position of the transmission light is displaced from the center of the optical fiber end face in radial direction, which enlarges fluctuation of the reception efficiency and limits the transmission distance.

Furthermore, since a method for reducing remote module reflection has not been disclosed, the conventional bidirectional optical communication device suffers interference due to the remote module reflection.

SUMMARY OF THE INVENTION

It is an object of the present invention to provide an inexpensive and small-size bidirectional optical communication device and bidirectional optical communication apparatus capable of carrying out full duplex bidirectional communication with one optical fiber, decreasing restraint of a transmission distance by reducing fluctuation of reception efficiency by the transmission distance, and reducing interference between transmission light and reception light.

In order to accomplish the above object, the present invention provides a bidirectional optical communication device for carrying out transmission and reception of an optical signal with use of one optical fiber having a curved end face as a transmission medium, comprising:

a light emitting element for generating transmission light;

a collection member for collecting transmission light emitted from the light emitting element and coupling the transmission light to the optical fiber; and a light receiving element for receiving reception light emitted from the optical fiber, wherein $$\theta_{fb} \leq 0 \leq \theta_{fa} \text{ or } \theta_{fa} \leq 0 \leq \theta_{fb}$$

is satisfied when angles of inclination $\theta_{fa}$ and $\theta_{fb}$ between an optical axis of the optical fiber and the transmission light after entering the optical fiber with a numerical aperture NA at an outermost periphery are expressed as follows:

$$\theta_{fa} = \mathrm{Sin}^{-1}[\{n_0 \mathrm{Sin}(\theta_L + \mathrm{Sin}^{-1}(NA)/n_0 + \theta_T)\}/n_f] - \theta_T$$

$$\theta_{fb} = \mathrm{Sin}^{-1}[\{n_0 \mathrm{Sin}(\theta_L - \mathrm{Sin}^{-1}(NA)/n_0 + \theta_T)\}/n_f] - \theta_T$$

where $\theta_L$ denotes an angle between an optical axis of transmission light prior to entering the optical fiber and an optical axis of the optical fiber, $\theta_T$ denotes an angle between a perpendicular line of the optical fiber end face in a position where the transmission light is coupled to the optical fiber and an optical axis of the optical fiber, NA denotes a numerical aperture of the transmission light collected by the collection member prior to entering the optical fiber, $n_f$ denotes a refractive index of a core of the optical fiber, and $n_o$ denotes a refractive index of space through which the transmission light passes prior to entering the optical fiber.

According to the above-structured bidirectional optical communication device, the transmission light goes into the optical fiber such that the angles of inclination $\theta_{fa}$ and $\theta_{fb}$ between an optical axis of the optical fiber and the transmission light after entering the optical fiber with a numerical aperture NA at an outermost periphery satisfy the above condition. Consequently, the incident transmission light in the optical fiber contains a lower mode, so that radiation light emitted from the other end of the optical fiber does not show a ring-shaped distribution larger in the peripheral part than in the central part of the optical fiber, thereby making it possible to provide a distribution of outgoing light achieving a maximum radiant intensity at a radiation angle of 0° even with the optical fiber having a short transmission distance. This makes it possible to decrease fluctuation of radiant intensity distribution of the outgoing light from the optical fiber, and decrease restraint of a transmission distance by controlling fluctuation of reception efficiency by the transmission distance.

In one embodiment of the invention, the transmission light enters the optical fiber end face with the optical axis of the transmission light inclined from a central axis side to a peripheral side of the optical fiber.

According to the bidirectional optical communication device of the above embodiment, making the transmission light going into the end face of the optical fiber with the optical axis of the transmission light inclined from a central axis side to a peripheral side of the optical fiber enables incidence of the transmission light to more peripheral side of the optical fiber end face, which makes it possible to decrease a transmission region and enlarge a reception region, resulting in improved reception efficiency. Further, the transmission light can direct incoming reflected light from the optical fiber end face toward the outside of the optical fiber, thereby achieving an effect of controlling near-end reflection.

In one embodiment of the invention, the bidirectional optical communication device further comprises an optical path changing member disposed between the collection member and the optical fiber for changing an optical path of the transmission light so as to lead the transmission light to a position displaced from a center of the optical fiber end face in radial direction.

According to the bidirectional optical communication device of the above embodiment, an optical path changing member disposed between the collection member and the optical fiber changes an optical path of the transmission light so that the transmission light is lead to a position displaced from the center of the optical fiber end face in radial direction, which facilitates optimization of an incidence angle of the transmission light to the optical fiber, as well as downsizes the bidirectional optical communication device and enlarges a reception region, thereby improving reception efficiency.

In one embodiment of the invention, the optical path changing member is a prism for changing an optical path of the transmission light by refracting the transmission light.

According to the bidirectional optical communication device of the above embodiment, a prism that changes an optical path of the transmission light through refraction of the transmission light is disposed in the vicinity of the optical fiber, which makes it possible to increase disposition freedom of a transmitting section and a receiving section for enabling optical path change immediately before the optical fiber. Also, appropriate setting of an inclined angle of the prism makes it possible to decrease remote module reflection.

In one embodiment of the invention, the collection member has an optical path changing function for changing an optical path of the transmission light so as to lead the transmission light to a position displaced from a center of the optical fiber end face in radial direction.

According to the bidirectional optical communication device of the above embodiment, with use of the optical path changing function of the collection member, the optical path of the transmission light is changed so that the transmission light is led to a position displaced from the center of the optical fiber end face in radial direction. Consequently, collection of the transmission light and optical path change may be performed in one member, which implements lower cost and downsizing.

In one embodiment of the invention, the collection member is a concave-surfaced reflection mirror that collects the transmission light by changing an optical path of the transmission light with use of reflection of the transmission light.

According to the bidirectional optical communication device of the above embodiment, a concave-surfaced reflection mirror for collecting transmission light by changing the optical path of the transmission light with use of reflection of the transmission light is disposed in the vicinity of the optical fiber. Consequently, the reflection mirror implements optical path change immediately before the optical fiber, which makes it possible to increase disposition freedom of a transmitting section and a receiving section.

The present invention also provides a bidirectional optical communication apparatus having a plurality of bidirectional optical communication devices optically coupled to each end of an optical fiber for carrying out transmission and reception of an optical signal among a plurality of the bidirectional optical communication devices with use of the optical fiber as a transmission medium, wherein at least one of the plurality of the bidirectional optical communication devices is the bidirectional optical communication device as defined above.

According to the above-structured bidirectional optical communication apparatus, the above-defined bidirectional optical communication device is used as at least one of a plurality of the bidirectional optical communication devices optically coupled to each end of the optical fiber. This enables full duplex communication with one optical fiber, and decreases fluctuation of reception efficiency due to a transmission distance so as to decrease constrain of the transmission distance for implementing an inexpensive small-size bidirectional optical communication apparatus.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is a schematic view showing a configuration of the bidirectional optical communication device;

FIG. 3 is a schematic view showing a transmission region and a reception region of an optical fiber;

FIG. 4 is a schematic view showing an interference prevention principle of the bidirectional optical communication device;

FIG. 5 is a schematic view showing a remote module reflection prevention principle of the bidirectional optical communication device;

FIG. 6 is a schematic view showing the shape of an end face of an optical fiber;

DETAILED DESCRIPTION OF THE PREFERRED EMBODIMENTS

A bidirectional optical communication device and a bidirectional optical communication apparatus of the present invention will be described hereinafter in conjunction with embodiments with reference to the accompanying drawings.

Figure 1:
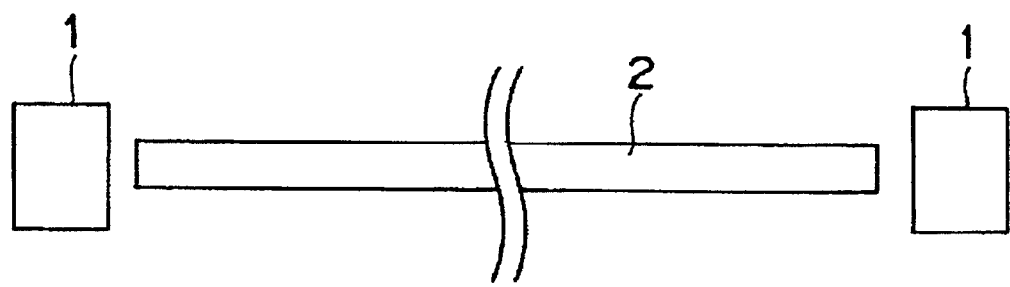
FIG. 1 is a schematic configuration view showing a basic configuration of a bidirectional optical communication apparatus using a bidirectional optical communication device according to a first embodiment of the present invention.

FIG. 1 is a schematic view showing a basic configuration of a bidirectional optical communication apparatus using a bidirectional optical communication device according to a first embodiment of the present invention. As shown in FIG. 1, the bidirectional optical communication apparatus 3 is provided with one optical fiber 2 for transmitting modulated light suitable for transmission based on a transmission data signal, and with bidirectional optical communication devices 1 each connected to both sides of the optical fiber 2 so as to be optically coupled.

FIG. 2 is a cross sectional view showing a schematic configuration of the bidirectional optical communication device 1. The bidirectional optical communication device 1 is composed of a light emitting element 4 for generating transmission light 8 that is modulated light based on a data signal, a light receiving element 5 for receiving reception light 9 from the optical fiber 2 and generating a data signal, a transmission lens 6 functioning as a collection member for collecting transmission light 8 emitted from the light emitting element 4 and coupling the same to the optical fiber 2, and a reflection mirror 7 for reflecting reception light 9 emitted from the optical fiber 2 and coupling the same to the light receiving element 5. The transmission lens 6 and the reflection mirror 7 are both formed in an optical member 10. The light emitting element 4 is mounted on a submount 12 such as SiC that is excellent in discharge characteristics. These component members (the light emitting element 4, the light receiving element 5, the optical member 10 and the submount 12) are disposed in alignment on a stem 13. The stem 13 is electrically connected to an unshown control circuit.

The transmission light 8 generated by the light emitting element 4 is radially diverged according to a radiation angle of a light emitting element 4. Then in a transmission lens 6, the transmission light 8 is collected with an numerical aperture being converted to an arbitrary value, and after passing through an optical member 10, the transmission light 8 is coupled to the optical fiber 2 having a spherically-shaped end face. Reception light 9 emitted from the optical fiber 2 is reflected by a reflection mirror 7 toward the direction of a light receiving element 5 while being collected by the reflection mirror 7 having curvature so as to be coupled to the light receiving element 5. In the case of spatially separating the transmission light 8 and the reception light 9 within an aperture of the optical fiber 2 as shown above, the reception light 9 emitted from an incidence position of the transmission light 8 in the optical fiber 2 is not coupled to the light receiving element 5. Therefore, the incidence position of the transmission light 8 in the optical fiber 2 is set to be the periphery side of the end face of the optical fiber 2 and a transmission area is set to be small so that the reception light 9 is effectively coupled to the light receiving element 5.

Also, the optical member 10 has a prism 11 as an optical path changing member that is inclined toward an optical axis of the optical fiber 2 on the incidence face of the transmission light 8, by which the transmission light 8 is refracted so that an optical path thereof is changed to enable incidence of the transmission light 8 to the end face of the optical fiber 2. Part of the reflection mirror 7 (shield portion 16) is disposed in contact with or in the vicinity of the optical fiber 2.

Part of transmission light 8 entering the optical fiber 2 is reflected by the end face of the optical fiber 2. Reflected light of the transmission light 8 in the optical fiber 2 is shielded by the shield portion 16 of the reflection mirror 7, and therefore not coupled to the light receiving element 5, thereby preventing interference due to near-end reflection.

Also, in the case of spatially separating transmission light and reception light in only one optical fiber 2, decreasing a transmission region of the optical fiber 2 to which the transmission light 8 is coupled as shown in FIG. 3 may enlarge a reception region and increases usable reception light 9, thereby providing a bidirectional optical communication device 1 with good reception efficiency. What is important here is to implement separation of the transmission light 8 and the reception light 9 with as small optical loss as possible. In the method disclosed in the first embodiment, where separation of transmission light and reception light is carried out by a thin-film reflection mirror 7, loss in the shield portion may be substantially equal to zero. In addition, the transmission light 8 may pass in the extreme vicinity of the reflection mirror 7, which almost eliminates a boundary between the transmission region and the reception region, thereby enabling enlargement of the reception region.

Next, description will be given of a prevention principle of near-end reflection and stray light with reference to FIG. 4.

As shown in FIG. 4, transmission light 8 is refracted by the prism 11 of the optical member 10 so that the transmission light 8 goes into the end face of the optical fiber 2 with the optical axis of the refracted transmission light 8 being inclined from the central axis side toward the periphery side of the optical fiber 2. Most part of reflected light 17 from the end face of the optical fiber 2 is reflected in reverse direction of the light receiving element 5 toward the periphery side of the optical fiber 2, which reduces occurrence of interference due to near-end reflection. More particularly, prevention of near-end reflection is preferably implemented by inclining the optical axis of the transmission light 8 from the central axis side toward the periphery side of the optical fiber 2 so that the transmission light 8 may go into the end face of the optical fiber 2. However, diffuse light 22 generated by such causes as diffusion of the transmission light 8 due to numerical aperture NA or dirt on the end face of the optical fiber 2 is reflected toward the light receiving element 5 side, thereby causing interference. In this first embodiment, the shield portion 16 that constitutes a top of the prism 11 of the optical member 10 and part of the reflection mirror 7 is disposed in contact with the optical fiber 2 or in a position away therefrom by several tens to hundreds $\mu$m, so that the reflected light 17 containing the diffuse light 22 is reflected (shielded) by the face opposed to the side of the reflection mirror 7 into which the reception light 9 goes, thereby preventing incidence to the light receiving element 5 side.

Also, part of the transmission light 8 emitted from the light emitting element 4 does not enter the transmission lens 6 but becomes stray light 18 that diffuses within the bidirectional optical communication device 1. The light receiving element 5, however, is optically separated from the optical member 10 on the side of the light emitting element 4 by the reflection mirror 7, which may prevent the stray light 18 from being coupled to the light receiving element 5. Further, even if displacement of the light emitting element 4 may occur due to assembly tolerance of the light emitting element 4, unexpected stray light 18 will not enter the light receiving element 5. This allows increase of assembly tolerance of the light emitting element 4, thereby reducing assembly cost. Although the reflected light 17 also diffuses inside the bidirectional optical communication device 1, it is not coupled to the light receiving element 5 because of the same reason. More specifically, the reflection mirror 7 has a function of reflecting and collecting the reception light 9 and coupling it to the light receiving element 5 while optically separating the reflected light 17, the diffuse light 22 and the stray light 18 from the light receiving element 5. The reflection mirror 7 in use is formed from a thin film such as aluminum deposited on the optical member 10 by such method as evaporation method. In addition, since the light receiving element 5 is separated by the reflection mirror 7, disposition of the emitting element 4 may be determined without taking influence of stray light into consideration, which increases freedom of designing the bidirectional optical communication device 1 and realizes a configuration easy in assembly adjustment.

Next, description will be given of a prevention principle of remote module reflection with reference to FIG. 5.

Occurrence of the remote module reflection in the bidirectional optical communication device 1 of the first embodiment is attributed to two factors; one is re-coupling of an element reflected light 19 reflected on the surface of the light receiving element 5 to the optical fiber 2, and the other is re-coupling of a prism reflected light 20 that is part of reception light 9 emitted from the optical fiber 2 being reflected by an irradiation surface of the optical member 10 (mainly the prism 11) to the optical fiber 2.

As shown in FIG. 5, a light receiving surface of the light receiving element 5 is usually given an antireflection coating made of, for example, a silicon nitride thin film or the like for preventing reflection of the reception light 9 and improving reception efficiency. However, not all the reception light 9 goes into the light receiving surface, but part thereof goes into an area other than the light receiving surface and reflects there, thereby causing remote module reflection. Consequently, the area other than the light receiving surface is given an antireflection coating such as a black-colored resist formed from a material high in optical absorption coefficient and low in reflection coefficient in a wavelength range for use, for ensuring restraint of remote module reflection.

Also, optimizing an angle of inclination θpof the prism 11 prevents re-coupling of the prism reflected light 20 even if the prism reflected light 20 goes into the optical fiber 2. More specifically, the prism reflected light 20 should enter the optical fiber 2 at an angle larger than an angle of the numerical aperture of the optical fiber 2 (an angle of the radius of entrance pupil against an object point). This is achieved by setting an angle of inclination of the prism 11 against the optical axis of the optical fiber 2 to be equal to the numerical aperture NA of the optical fiber 2 or larger. For example, for using an optical fiber 2 with numerical aperture NA of 0.3, the angel of inclination $\theta_p$ should be 10° or larger, preferably 17° or larger. It is also applicable to provide an AR coating to the surface of the optical member 10 which is irradiated by the reception light 9 (the surface on which the prism 11 is formed) for reducing a reflection coefficient. However, if an angle of inclination $\theta_p$ of the prism 11 is changed, an incidence angle of the transmission light 8 to the optical fiber 2 is also changed, which necessitates setting of the angle of inclination $\theta_p$ of the prism 11 with consideration to a condition for preventing a ring-shaped radiant intensity distribution of outgoing light even with a short optical fiber 2 in use as described later.

Description will now be given of far-end reflection of an optical fiber.

In the case where the end face of the optical fiber is vertical to the optical axis, refractive index difference between air and the optical fiber generates far-end reflection of about 4%. The far-end reflection may be reduced by contriving the shape of the end face of the optical fiber. For example, there are a method for inclining the end face of an optical fiber 2A toward the optical axis as shown in FIG. 6A, and a method for making the end face of an optical fiber 2B curved as shown in FIG. 6B. In the both methods, the angle of reflected light is set to be larger than the numerical aperture of the optical fibers 2A and 2B by changing direction of far-end reflection on the end face of the optical fibers 2A and 2B, so that the far-end reflection will not travel through the optical fibers 2A and 2B. However, in the case where the end face is inclined as shown in FIG. 6A, rotation of the optical fiber 2A around an axis thereof changes inclination direction, which makes it difficult to prevent near-end reflection. The optical fiber 2B has a fixed inclination direction of the end face, which brings about a fixed insertion direction of the optical fiber 2B, thereby damaging convenience. Consequently, the end face of the optical fiber 2B is preferably a curved surface having rotational symmetry around the center of the optical fiber 2B. In view of processing, the shape of the end face is more preferably a spherical surface. Particularly in POF, pressing the end face against an arbitrary shaped hot plate for melting enables facilitated inclination processing and spherical surface processing. Also, shaping the end face of the optical fiber into a spherical shape enables collection and incidence of reception light, which brings about an effect of improving reception efficiency.

Description will next be given of an incidence angle of transmission light to an optical fiber.

Figure 15:
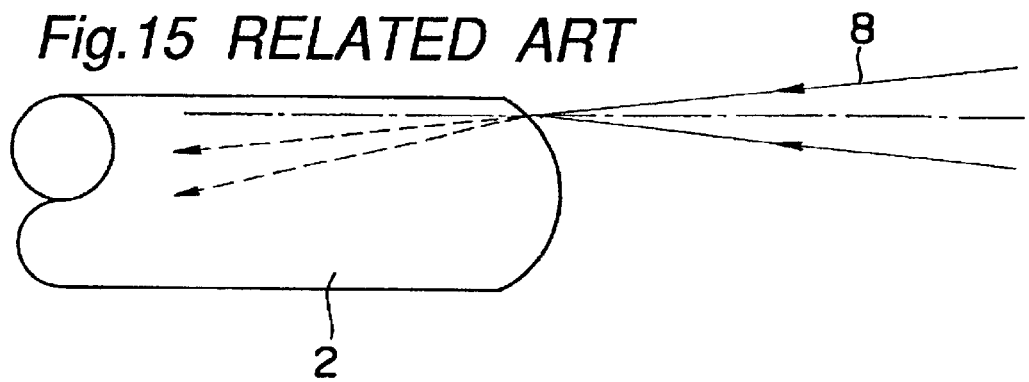
FIG. 15 is a schematic view showing an incidence state of transmission light to an optical fiber having a spherically-shaped end face.
Figure 16:
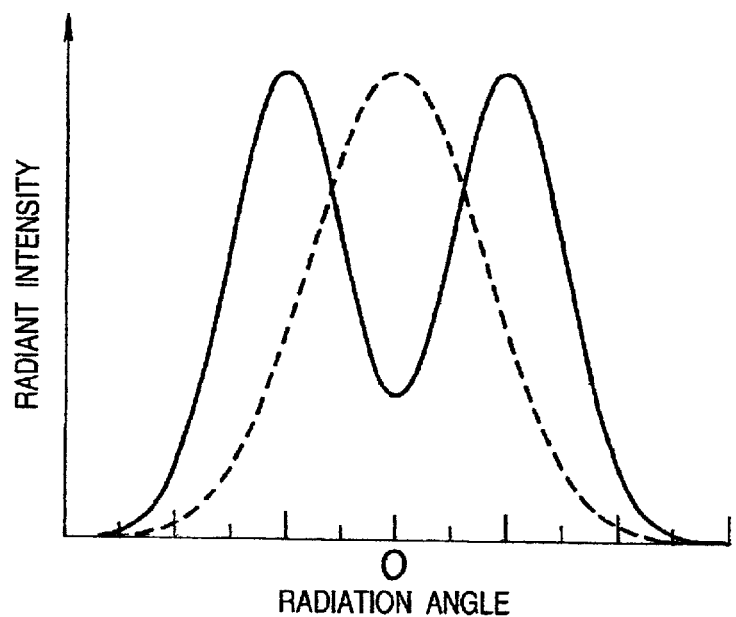
FIG. 16 is a view showing a radiant intensity distribution of outgoing light from an optical fiber.

In the case where transmission light 8 enters an optical fiber 2 having a curved end face as shown in FIG. 15, the optical axis of the transmission light 8 is changed by refraction after the transmission light 8 enters the optical fiber 2. For example, in an optical fiber 2 as short as about 1 m, optical axis direction of the transmission light 8 after entrance to the optical fiber 2 changes radiant intensity distribution of light emitted from the other end of the optical fiber 2. In an optical fiber 2 as relatively long as about 50 m, the mode of the transmission light 8 is changed during traveling, so that radiation light emitted from the other end shows a distribution determined by the structure (numerical aperture NA) of the optical fiber 2 and therefore does not depend on the incidence condition. Specifically in the case where most part of transmission light 8 entering the optical fiber 2 is composed of a higher mode, outgoing light from the optical fiber 2 may show a ring-shaped distribution in which radiant intensity does not peak at a radiation angle of 0° as shown with a solid line in FIG. 16. In the case where inclination of the optical axis of the transmission light 8 in the optical fiber 2 toward the optical fiber 2 is small (lower mode is dominant), there is shown a distribution in which radiant intensity peaks at a radiation angle of 0° as shown with a broken line in FIG. 16. In the case of a long transmission distance, there is shown a distribution in which radiant intensity peaks at a radiation angle of 0° as shown with the broken line in FIG. 16. Considerable change in radiant intensity distribution of outgoing light causes fluctuation of reception efficiency, and the radiant intensity exceeding a dynamic range of a reception system disables reception, thereby generating restraint of the transmission distance. Consequently, it is preferable that outgoing light from the optical fiber 2 provides a distribution in which radiant intensity peaks at a radiation angle of 0° without depending on the transmission distance as shown with a broken line in FIG. 16.

For this, an incidence angle of the transmission light 8 to the optical fiber 2 should be such that a lower mode is present after incidence of the transmission light 8 to the optical fiber 2. More particularly, part of the transmission light 8 after entering the optical fiber 2 is parallel to the optical axis of the optical fiber 2.

Description will now be given of an incidence angle of transmission light 8 that is the condition for allowing a lower mode to be present after incidence to the optical fiber 2.

Figure 7:
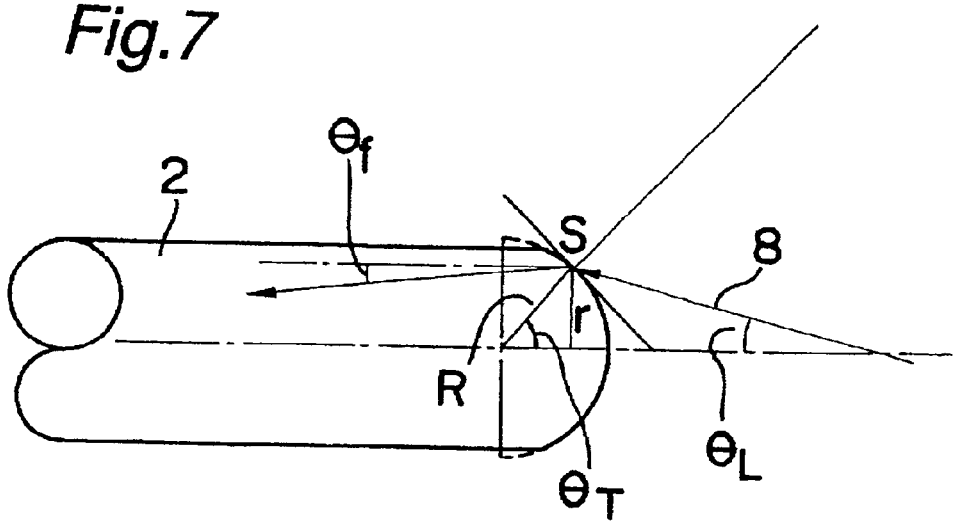
FIG. 7 is a schematic view showing an incidence state of a transmission light to an optical fiber.

FIG. 7 is a schematic view showing the incidence state of transmission light to an optical fiber, where $\theta_L$ denotes an angle between the optical axis of the optical fiber 2 and the optical axis of the transmission light 8, R denotes radius of curvature of the end face of the optical fiber 2, and S denotes an incidence position of the transmission light 8 to the optical fiber 2, which is displaced from the central axis of the optical fiber 2 in radial direction by r. In the position S, an angle $\theta_T$ between a perpendicular line and the optical axis of the optical fiber 2 is expresses as shown below:

$$\theta_T = \mathrm{Sin}^{-1}(r/R)$$

Therefore, when $n_f$ denotes a refractive index of the core of the optical fiber 2, $n_o$ denotes a refractive index of outside (air), and $\theta_f$ denotes an angle between the optical axis of the transmission light 8 after entering the optical fiber 2 and the optical axis of the optical fiber 2, the following expression is formed:

$$\theta_f = \sin^{-1}\{n_o/n_f \sin(\theta_L+\theta_T)\}-\theta_T \quad (1)$$

Figure 8:
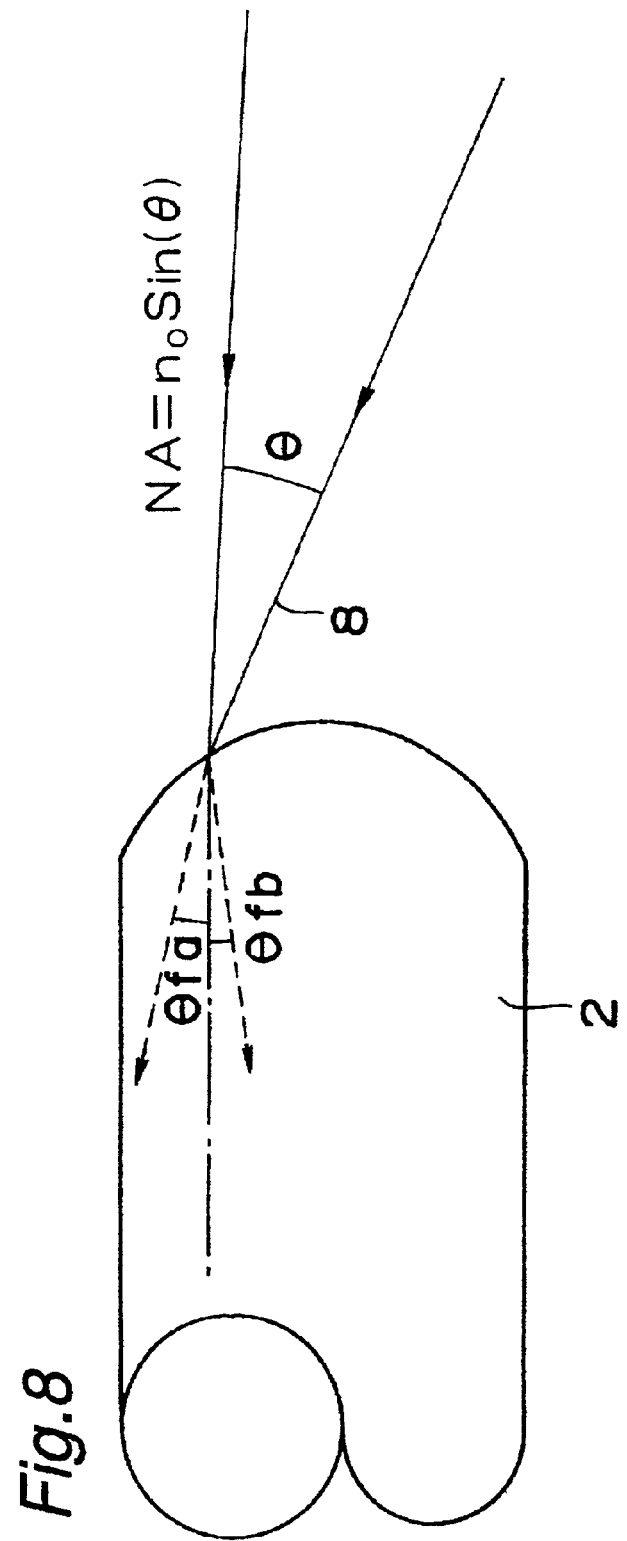
FIG. 8 is a schematic view showing an incidence state of a transmission light to an optical fiber.

Also, as shown in FIG. 8, with consideration to diffusion by numerical aperture NA of the transmission light 8, angles $\theta_{fa}$, $\theta_{fb}$ between the optical axis of the optical fiber 2 and the transmission light 8 after entering the optical fiber 2 with the numerical aperture NA at the outermost periphery are each expressed as follows:

$$\theta_{fa} = \sin^{-1}[\{n_0 \sin(\theta_L+\sin^{-1}(NA)/n_0+\theta_T)\}/n_f]-\theta_T \quad (2)$$

$$\theta_{fb} = \sin^{-1}[\{n_0 \sin(\theta_L-\sin^{-1}(NA)/n_0+\theta_T)\}/n_f]-\theta_T \quad (3)$$

After the transmission light 8 enters the optical fiber 2, a component parallel to the optical axis of the optical fiber 2 (lower mode) can be present if at least the following condition is satisfied:

$$\theta_{fa} \geq 0 \geq \theta_{fb} \text{ or } \theta_{fa} \leq 0 \leq \theta_{fb} \quad (4)$$

Incidence of the transmission light 8 to the optical fiber 2 so as to satisfy the above condition makes it possible to obtain a distribution in which radiant intensity peaks at a radiation angel of 0° even in the case of a short optical fiber 2.

Detailed description will now be given of the case of a bidirectional optical communication device 1 in the first embodiment shown in FIG. 2.

Figure 9:
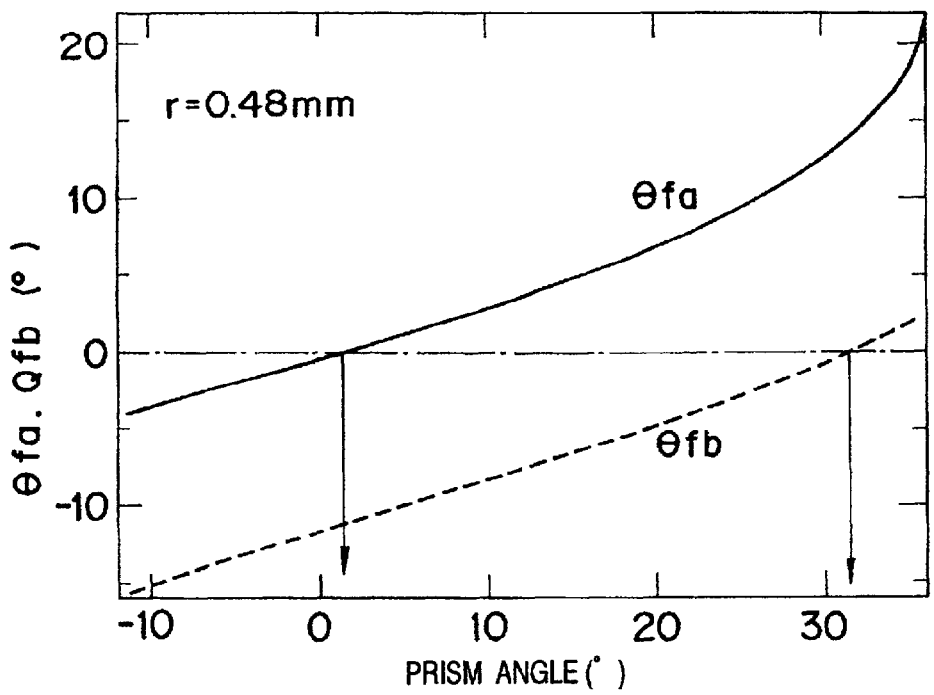
FIG. 9 is a view showing an optimum value of the prism angle of the bidirectional optical communication device.
Figure 10:
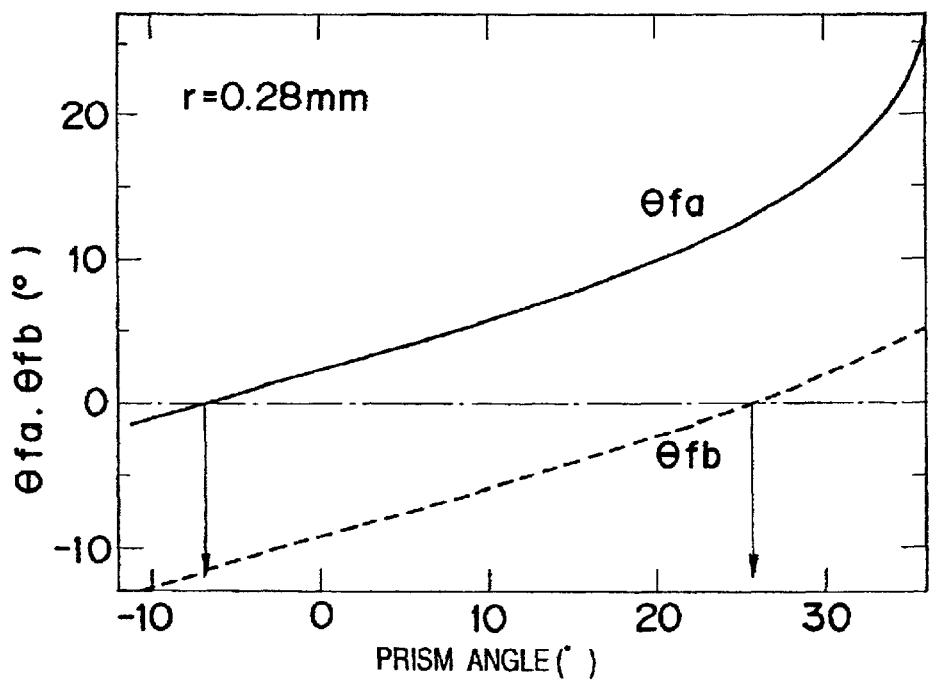
FIG. 10 is a view showing an optimum value of the prism angle of the bidirectional optical communication device.

As shown in FIG. 2, the transmission light 8 is radiated from the light emitting element 4 in parallel with the optical axis of the optical fiber 2, and converted to have an arbitrary numerical aperture NA in the transmission lens 6. The transmission light 8 converted in the transmission lens 6 is refracted by the prism 11 so as to change an incidence angle to the optical fiber 2. For example, in the case of using POF having an aperture of 1 mm (refractive index $n_f$=1.5) as an optical fiber 2, where a radius of curvature of the end face of the optical fiber is R=1.6 mm, displacement for determining the incidence position is r=0.48 mm, a numerical aperture of the transmission light 8 is NA=0.1, a refractive index of outside (air) is $n_o$=1, and a refractive index of the optical member 10 is $n_B$=1.5, relation between an angle of inclination of the prism 11 $\theta_p$ and $\theta_{fa}$, $\theta_{fb}$, is expressed as shown in FIG. 9. In the case where only the incidence position of the transmission light 8 to the optical fiber 2 is changed to r=0.28 mm, the relation is as shown in FIG. 10.

More particularly, in the case where the incidence position is r=0.48 mm, the angle of inclination $\theta_p$ of the prism 11 that satisfies the formula (4) is 0.4° to 31.6°, whereas in the case where the incidence position is r=0.28 mm, the angle is −6.8° to 25.6°. In these cases, there may be provided a distribution of outgoing light from the optical fiber 2 in which radiant intensity always peaks at a radiation angle of 0° regardless of the length of the optical fiber 2.

Figure 11:
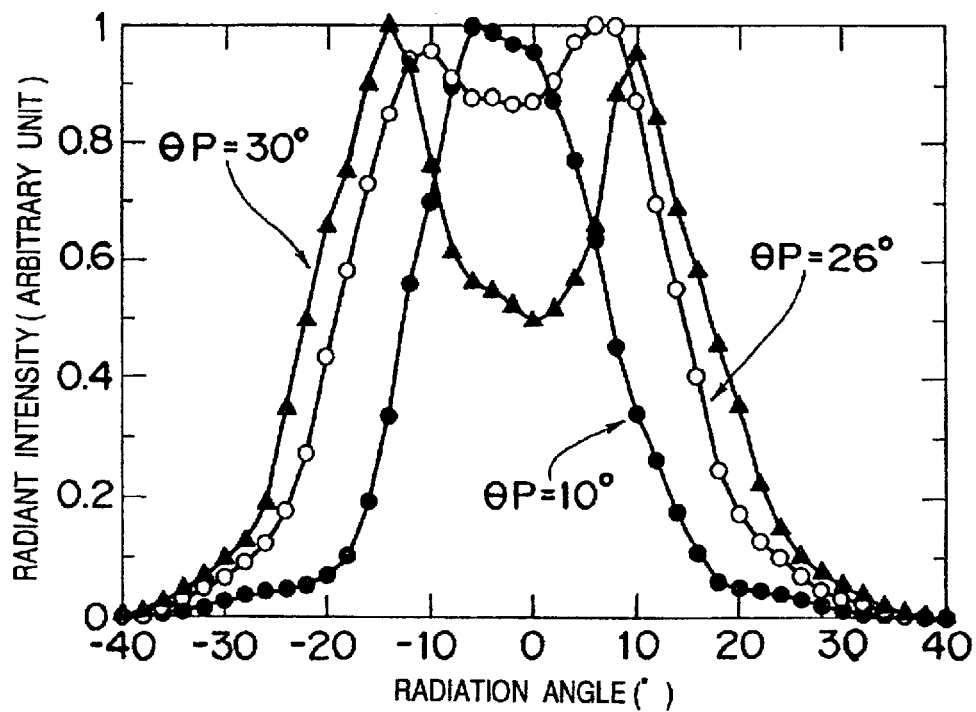
FIG. 11 is a view showing a radiant intensity distribution of outgoing light from an optical fiber by prism angle.

FIG. 11 shows a result of measuring a radiant intensity distribution of outgoing light emitted from an optical fiber 2 having a length of 1 m in the case where the incidence position is r=0.28 mm. In the case where the angle of inclination $\theta_p$ of the prism 11 is 10°, there is provided a distribution in which radiant intensity peaks at a radiation angle of 0°, while in the case where the angle of inclination $\theta_p$ is 26°, intensity at a radiation angle of 0° is slightly decreased, and in the case where the angle of inclination $\theta_p$ is 30°, there is provided a completely ring-shaped distribution. In the case where the angle of inclination $\theta_p$ of the prism 11 is small, the same distribution as the case of 26° is provided when the angle is −7°. Therefore, setting the angle of the prism 11 in the range of about −6° to 25° provides a distribution in which radiant intensity peaks at a radiation angle of 0°.

Also, the position of the optical fiber 2 against the bidirectional optical communication device 1 fluctuates by tolerance of the core diameter of the optical fiber 2 itself or by assembly tolerance of the bidirectional optical communication device 1. For example, in the case of using POF having an aperture of 1 mm as an optical fiber 2, tolerance of the core diameter thereof is about ±60 μm (JIS C6837), and with consideration to assembly tolerance, there is generated axis displacement of about ±100 μm. Accordingly, it is necessary to set the angle of inclination $\theta_p$ of the prism 11 for allowing the axis displacement. If the incidence position of the transmission light 8 to the optical fiber 2 is set to r=0.38 mm, the angle fluctuates in the range of r=0.28 to 0.48 mm with the axis displacement of ±100 μm due to tolerance. Therefore, based on FIGS. 9 and 10, it is necessary to set the angle of inclination $\theta_p$ of the prism 11 in the range of 1.4° to 25.6° so that the formula (4) is satisfied both in r=0.48 mm and r=0.28 mm.

The prism 11 has a function of decreasing remote module reflection. Since this effect is increased as an angle of inclination $\theta_p$ of the prism 11 becomes larger, the angle of inclination $\theta_p$ of the prism 11 is preferably set to have a value close to an upper limit (around 20° to 25°). In this case, the transmission light 8 enters the end face of the optical fiber 2 with the optical axis of the transmission light 8 inclined from the central axis side of the optical fiber 2 toward the peripheral side, which enables restraint of near-end reflection as described before.

As described above, by setting the incidence angle of the transmission light 8 to the optical fiber 2 as the formulas (2), (3), and (4), fluctuation of radiant intensity distribution of outgoing light from the optical fiber 2 due to the transmission distance may be reduced, which fulfills provision of a bidirectional optical communication device 1 small in fluctuation of reception efficiency and capable of carrying out short distance to long distance communication.

In addition, changing the optical path of the transmission light 8 in the vicinity of the optical fiber 2 with use of the prism 11 makes it possible to increase freedom of disposing a transmission system and a reception system, thereby enabling provision of a small-sized high-efficiency bidirectional optical communication device 1.

Description will now be given of a method for preventing electric and electromagnetic interference.

In FIG. 2, the stem 13 is connected to a ground electrode of the light receiving element 5. The submount 12 is composed of an insulating material such as SiC, which electrically isolates the light emitting element 4 and the light receiving element 5. The reflection mirror 7 also forms an electrode 21 beneath the optical member 10, and the electrode 21 electrically connects the reflection mirror 7 to the stem 13. Specifically, in view of the light emitting element 4, the light receiving element 5 is shielded by the reflection mirror 7 and the stem 13, which controls electromagnetic interference. The reflection mirror 7 is formed by depositing a material having high reflectance and conductivity such as aluminum and gold from the lower left side of the optical member 10 in FIG. 2. Here at the same time, the electrode 21 is formed. The reflection mirror 7 and the electrode 21 constitute the entire surface of the lower side of the optical member 10, so that they are easily formed without patterning with a mask and the like. The light emitting element 4 and a monitor photodiode 14 are covered with a transmitting section cover 15. The transmitting section cover 15, which is attached to the optical member 10 and the stem 13, seals the light emitting element 4 from outside air. The transmitting section cover 15, which is also electrically connected to the stem 13, functions to electromagnetically seal the light emitting element 4 from the outside. Part of the optical member 10 is used as part of a sealing member (equivalence of typical cover glass) of the light emitting element 4, which makes it possible to reduce the number of components, decrease component costs, as well as simplify manufacturing process.

As the optical fiber 2, there is preferably used a multi-mode optical fiber such as POF. POF has a core made of a plastic with good optical transparency such as PMMA (Polymethyl Metha Acrylate) and polycarbonate, and a clad composed of a plastic with a refractive index lower than that of the core. Such optical fiber 2 is easy to increase the core diameter from about 200 μm to about 1 mm compared to a quartz optical fiber, which facilitates adjustment of coupling to the bidirectional optical communication device 1, thereby enabling provision of an inexpensive bidirectional optical communication apparatus 3. As shown in the first embodiment, for spatial separation between the transmission light 8 and the reception light 9, the core diameter around 1 mm is preferable.

Other acceptable fibers for use include PCF (Plastic Clad Fiber) having a core made of quarts glass and a clad composed of a polymer. Although PCF is expensive compared to POF, it has small transmission loss and a wide transmission band. Because of this characteristic, PCF used as a transmission medium fulfils a bidirectional optical communication apparatus 3 enabling long distance communication and higher-speed communication.

As the light emitting element 4, there is used a semiconductor laser and a light emitting diode (LED). The preferable light emitting element 4 has a wavelength small in transmission loss of a optical fiber 2 for use and is inexpensive. For example, in using POF as an optical fiber 2, there may be used a semiconductor laser or the like having a wavelength of 650 nm that provides mass production effect in DVD (Digital Versatile Disk) and the like. A monitor photodiode 14 is disposed on the rear side of the light emitting element 4 for maintaining quantity of light from the light emitting element 4 constant.

As the light receiving element 5, there is used a photodiode that converts strength and weakness of received modulated light into an electric signal and has high sensitivity in the wavelength region of the light emitting element 4, such as a PIN photodiode and an avalanche photodiode made of a silicon.

The optical member 10 is manufactured by such process as injection molding from a plastic material such as PMMA and polycarbonate, and given a metallic thin film having high reflectivity such as aluminum and gold by such method as evaporation method on the side of the reflection mirror 7. Depositing the reflection mirror 7 from the lower left side of the optical member 10 shown in FIG. 2 enables easy formation without patterning with a mask and the like. The reflection mirror 7 has a concave surface and functions to collect the reception light 9. On the surface in contact with the stem 13 beneath the optical member 10, there is formed an electrode 21. The electrode 21 is formed by such method as evaporation method together with the reflection mirror 7, and at least part thereof engages with the reflection mirror 7. In the optical member 10, there is formed a positioning notch (unshown) for positioning a light emitting element 4 and a transmission lens 6 for collecting the transmission light 8 and coupling it to the optical fiber 2, a prism 11 for refracting the transmission light 8 for enabling the transmission light 8 to enter the optical fiber 2. The optical member 10 is also used as part of a sealing member of the light emitting element 4. Providing the optical member 10 with versatile functions as stated above enables considerable reduction of the component members as well as decrease of tolerance in assembly, which makes it possible to provide a small-size bidirectional optical communication device 1 in low cost. Further, the light emitting element 4, the light receiving element 5, and the optical member 10 may be disposed on one stem 13 each in parallel with the optical axis of the optical fiber 2, which saves complex assembling process, thereby realizing considerable reduction of assembly process.

As described above in the first embodiment, use of the bidirectional optical communication device 1 as at least one of the bidirectional optical communication devices constituting a bidirectional optical communication apparatus 3 makes it possible to prevent interference of light due to near-end reflection, far-end reflection, remote module reflection and stray light, and to reduce electric and electromagnetic interference, which implements full duplex bidirectional optical communication with only one optical fiber 2.

In addition, setting the incidence angle of the transmission light 8 to the optical fiber 2 according to the formula (4) makes it possible to decrease fluctuation of radiant intensity distribution of outgoing light from the optical fiber 2, and enlarges the range of a transmission distance, thereby increasing the dynamic range of the receiving section. Further, the prism 11 changing the optical path of the transmission light 8 before the transmission light 8 entering the optical fiber 2 as well as one optical member 10 having versatile functions enable provision of a bidirectional optical communication device 1 that is low in cost, small in size, and easy to manufacturing.

Second Embodiment

Figure 12:
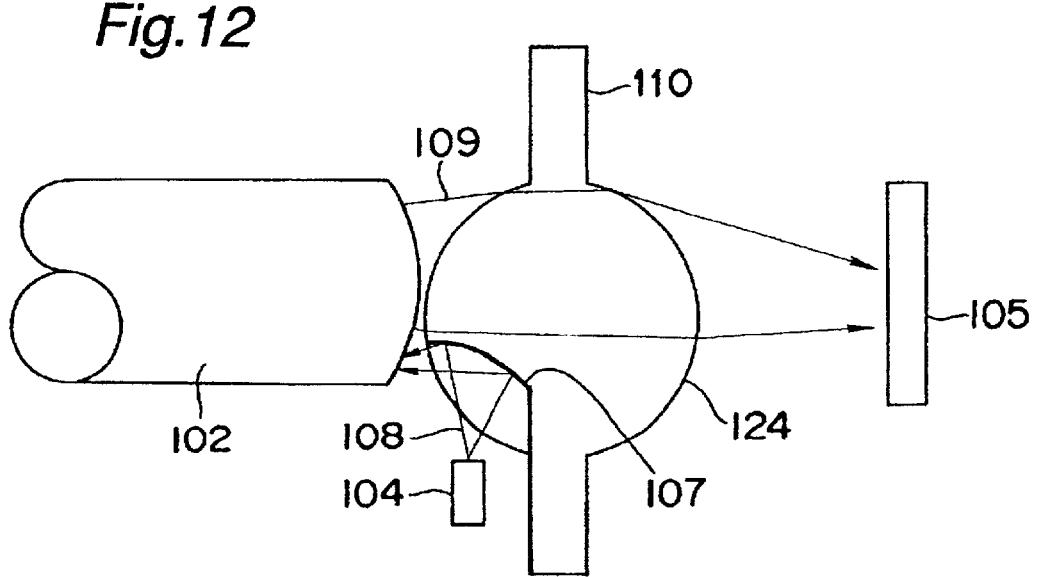
FIG. 12 is a schematic view showing a configuration of a bidirectional optical communication device according to a second embodiment of the present invention.

FIG. 12 is a schematic view showing the configuration of a bidirectional optical communication device in a second embodiment of the present invention. The bidirectional optical communication device is composed of a light emitting element 104 for generating transmission light 108 that is modulated light based on a data signal, a light receiving element 105 for receiving reception light 109 from an optical fiber 102 and generating a data signal, a reflection mirror 107 for reflecting transmission light 108 emitted from the light emitting element 104 and coupling the same to the optical fiber 102, and a reception lens 124 functioning as a collection member for collecting reception light 109 emitted from the optical fiber 102 and coupling the same to the light receiving element 105. The reflection mirror 107 and the reception lens 124 are both formed in an optical member 110.

In the second embodiment, there is shown a case in which disposition of the light emitting element and the light receiving element is opposed to that of the first embodiment. More particularly, transmission light 108 emitted from the light emitting element 104 such as an light emitting diode (LED) is reflected by the concave-surfaced reflection mirror 107 formed in the optical member 110 while being collected and coupled to the optical fiber 102 having a convex-surfaced end face. Reception light 109 is collected by the reception lens 124 formed in the optical member 110 and coupled to the light receiving element 105. Reflected light caused by near-end reflection of the transmission light 108 on the end face of the optical fiber 102 is shielded by the reflection mirror 107 and not coupled to the light receiving element 105. Similarly, stray light is not coupled to the light receiving element 105 either. Since reflection of the reception light 109 is diffused by the convex surface of the reception lens 124, remote module reflection may be reduced.

The reflection mirror 107 has both an NA conversion function and an optical path changing function for the transmission light 108, and functions as both a transmission lens 106 and a prism 111 in the first embodiment. The shape of the reflection mirror 107 is optimized so that the incidence angle of the transmission light 108 to the optical fiber 102 satisfies the formula (4).

As described above, the bidirectional optical communication device 101 in the second embodiment, like the bidirectional optical communication device in the first embodiment, enables constraint of far-end reflection, near-end reflection and remote module reflection, and also enables decrease in fluctuation of radiant intensity distribution of outgoing light from the optical fiber 102. In addition, the reflection mirror 107 performs both the NA conversion and the optical path change for the transmission light 108, thereby enabling provision of an inexpensive small-size bidirectional optical communication device 101.

Third Embodiment

Figure 13:
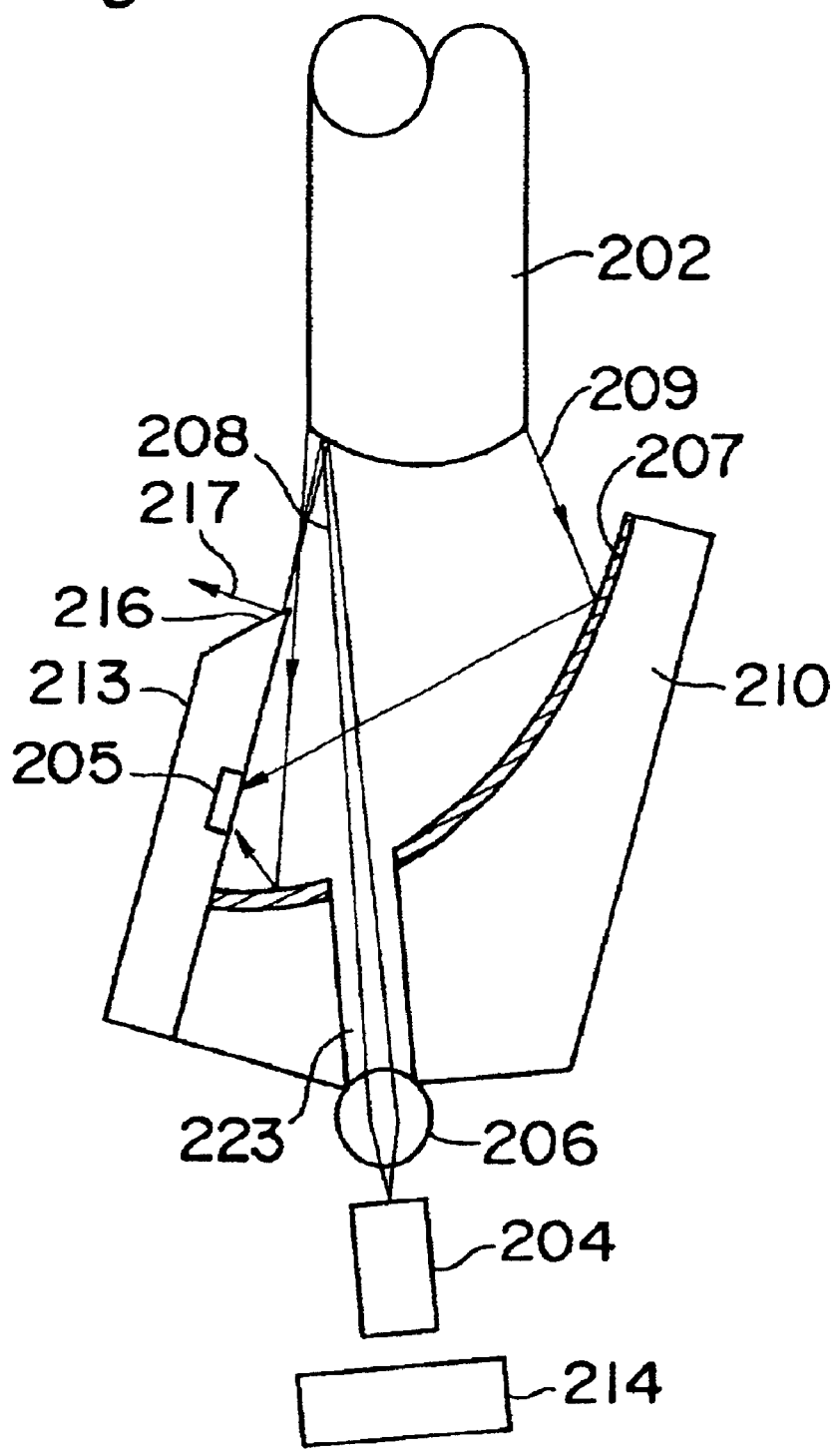
FIG. 13 is a schematic view showing a configuration of a bidirectional optical communication device according to a third embodiment of the present invention.
Figure 14:
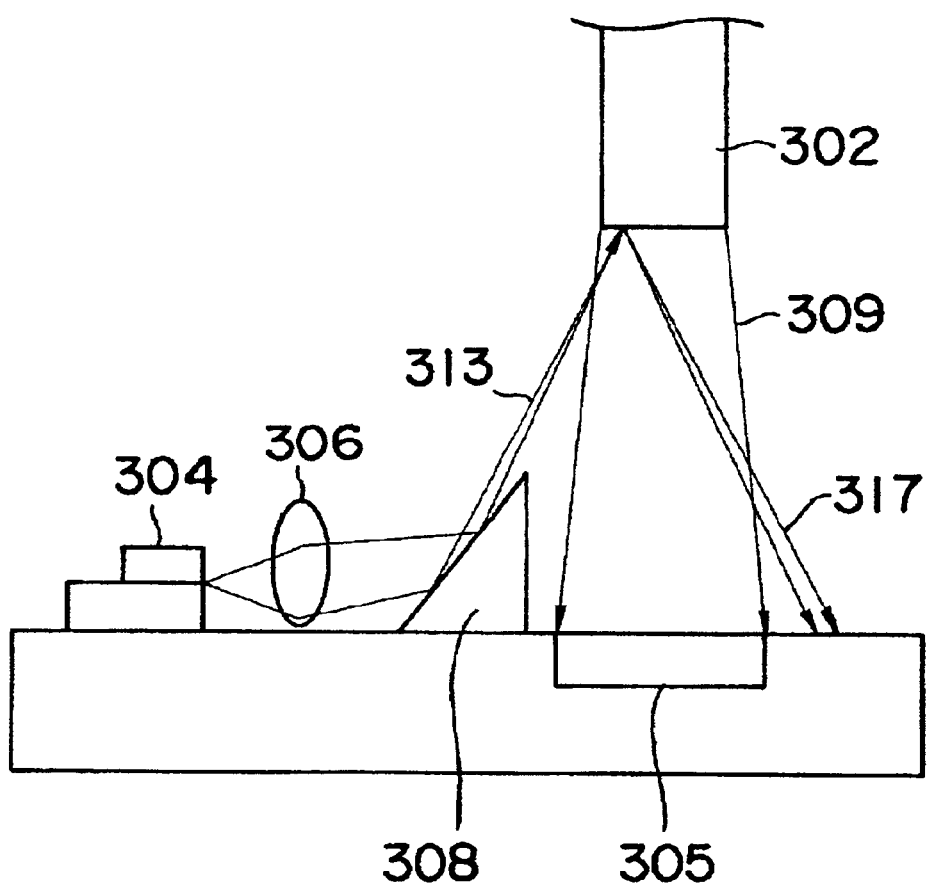
FIG. 14 is a schematic view showing a conventional bidirectional optical communication device.

FIG. 13 is a schematic view showing the configuration of a bidirectional optical communication device in a third embodiment of the present invention. The bidirectional optical communication device is composed of a light emitting element 204 for generating transmission light 223 that is modulated light based on a data signal, a light receiving element 205 for receiving reception light 209 from an optical fiber 202 and generating a data signal, a transmission lens 206 for collecting transmission light 108 emitted from the light emitting element 204 and coupling the same to the optical fiber 202, and a reflection mirror 207 functioning as a collection member for reflecting reception light 209 emitted from the optical fiber 202 and coupling the same to the light receiving element 205. The reflection mirror 207 is formed in an optical member 210.

As shown in FIG. 13, transmission light 208 radiated from the light emitting element 204 undergoes conversion of an numerical aperture NA in a transmission lens 206 that is a ball lens, and enters the periphery of a spherically-surfaced end face of the optical fiber 202. Reception light 209 radiated from the optical fiber 202 is collected by a concave-surfaced reflection mirror 207 formed in the optical member 210 and coupled to the light receiving element 205. Although reflected light 217 reflected by the end face of the optical fiber 202 is reflected toward left direction of FIG. 13 by a convex surface of the end face of the optical fiber 202, the reflected light 217 is shielded by part of a stem 213 (shield portion 216) in which the light receiving element 205 is disposed and is not coupled to the light receiving element 205, so that near-end reflection is prevented. Transmission light 208 passes through a cavity portion 223 provided in part of the optical member 210 and couples to the optical fiber 202. Part of the reflection mirror 207 also forms the cavity portion 223. More particularly, the cavity portion 223 functions as the transmission region shown in FIG. 3, and the remaining part functions as the reception region. By decreasing the cavity portion 223, the reception region may be enlarged, resulting in improved reception efficiency. Therefore, it is preferable to decrease the aperture of the transmission lens 206 and decrease the numerical aperture NA of the transmission light 208. The farther the cavity portion 223 of the reflection mirror 207 is away from the end face of the optical fiber 202, the more the reception light 209 radiates and diffuses, thereby decreasing relative area of the cavity portion 223.

The incidence angle of the transmission light 208 to the optical fiber 202 is optimized so as to satisfy the formula (4). Unlike the first and second embodiments, the bidirectional optical communication device 201 of the third embodiment is not provided with an optical path changing member, so that the optical member 210 and the light emitting element 4 itself are inclined for optimizing the incidence angle. Alternatively, relative positions of the transmission lens 206 and the light emitting element 204 are displaced so that the transmission light 208 is refracted by the transmission lens 206, thereby inclining the optical axis of the transmission light 208 against the optical axis of the optical fiber 202.

As described above, in the third embodiment, there is shown the configuration of the bidirectional optical communication device 201 without using the optical path changing member. Like the first and the second embodiments, this configuration makes it possible to control far-end reflection, near-end reflection, and remote module reflection, as well as to decrease fluctuation of radiant intensity distribution of outgoing light from the optical fiber 202.

It is understood that the bidirectional optical communication device having the configuration shown in the first to the third embodiments is only an example in which an incidence condition of transmission light 820 to the optical fiber 202 is to satisfy the formula (4), and partial modification thereof may provide the same effect. It is also understood that if the end face of the optical fiber 202 is not spherically surfaced but has other shapes such as a curved shape and an inclined shape, optimization of the incidence condition based on the same principle may implement the same effect.

Further, in the bidirectional optical communication apparatus of the present invention, use of a plastic optical fiber having a core and a clad formed from a plastic enables easy manufacturing of a large-diameter optical fiber having a core diameter of about 1 mm, which facilitates adjustment of coupling of the optical fiber and the bidirectional optical communication device, makes it easy to separate a transmission region and a reception region, enables manufacturing of the bidirectional optical communication apparatus in low cost, and facilitates processing of the end face.

Further, since the end face of the optical fiber is in the shape of sphere, reception light may be collectively emitted, which enables coupling of reception light to the light receiving element with higher efficiency. Also, since it is not necessary to fix the direction of connection between the optical fiber and the bidirectional optical communication device, connection may be easily established. In addition, the optical fiber with a spherically-surfaced end face allows easy end face processing.

The invention being thus described, it will be obvious that the invention may be varied in many ways. Such variations are not be regarded as a departure from the spirit and scope of the invention, and all such modifications as would be obvious to one skilled in the art are intended to be included within the scope of the following claims.

What is claimed is:

1. A bidirectional optical communication device for carrying out transmission and reception of an optical signal with use of one optical fiber having a curved end face as a transmission medium, comprising:

a light emitting element for generating transmission light;

a collection member for collecting transmission light emitted from the light emitting element and coupling the transmission light to the optical fiber; and a light receiving element for receiving reception light emitted from the optical fiber, wherein $$\theta_{fb} \leq 0 \leq \theta_{fa} \text{ or } \theta_{fa} \leq 0 \leq \theta_{fb}$$

is satisfied when angles of inclination $\theta_{fa}$ and $\theta_{fb}$ between an optical axis of the optical fiber and the transmission light after entering the optical fiber with a numerical aperture NA at an outermost periphery are expressed as follows:

$$\theta_{fa} = \sin^{-1}[\{n_0 \sin(\theta_L + \sin^{-1}(NA)/n_0 + \theta_T)\}/n_f] - \theta_T$$

$$\theta_{fb} = \sin^{-1}[\{n_0 \sin(\theta_L - \sin^{-1}(NA)/n_0 + \theta_T)\}/n_f] - \theta_T$$

where $\theta_L$ denotes an angle between an optical axis of transmission light prior to entering the optical fiber and an optical axis of the optical fiber, $\theta_T$ denotes an angle between a perpendicular line of the optical fiber end face in a position where the transmission light is coupled to the optical fiber and an optical axis of the optical fiber, NA denotes a numerical aperture of the transmission light collected by the collection member prior to entering the optical fiber, $n_f$ denotes a refractive index of a core of the optical fiber, and $n_o$ denotes a refractive index of space through which the transmission light passes prior to entering the optical fiber.

2. The bidirectional optical communication device as defined in claim 1,
wherein the transmission light enters the optical fiber end face with the optical axis of the transmission light inclined from a central axis side to a peripheral side of the optical fiber.

3. The bidirectional optical communication device as defined in claim 1, further comprising
an optical path changing member disposed between the collection member and the optical fiber for changing an optical path of the transmission light so as to lead the transmission light to a position displaced from a center of the optical fiber end face in radial direction.

4. The bidirectional optical communication device as defined in claim 3,
wherein the optical path changing member is a prism for changing an optical path of the transmission light by refracting the transmission light.

5. The bidirectional optical communication device as defined in claim 1,
wherein the collection member has an optical path changing function for changing an optical path of the transmission light so as to lead the transmission light to a position displaced from a center of the optical fiber end face in radial direction.

6. The bidirectional optical communication device as defined in claim 5,
wherein the collection member is a concave-surfaced reflection mirror that collects the transmission light by changing an optical path of the transmission light with use of reflection of the transmission light.

7. A bidirectional optical communication apparatus having a plurality of bidirectional optical communication devices optically coupled to each end of an optical fiber for carrying out transmission and reception of an optical signal among a plurality of the bidirectional optical communication devices with use of the optical fiber as a transmission medium, wherein
at least one of the plurality of the bidirectional optical communication devices is the bidirectional optical communication device as defined in claim 1.

* * * * *